Jan. 27, 1970  W. W. YATES  3,492,520

PERMANENT MAGNET ROTOR

Filed Feb. 14, 1967

United States Patent Office 3,492,520
Patented Jan. 27, 1970

1

3,492,520
PERMANENT MAGNET ROTOR
William W. Yates, Lima, Ohio, assignor to Westinghouse Electric Corporation, Pittsburgh, Pa., a corporation of Pennsylvania
Filed Feb. 14, 1967, Ser. No. 616,062
Int. Cl. H02k 1/22
U.S. Cl. 310—261                           5 Claims

ABSTRACT OF THE DISCLOSURE

A permanent magnet rotor for dynamoelectric machines employing at least one ferrite permanent magnet in the form of an elongated slab or plate disposed near the radial center of a hollow rotor core and extending axially beyond the ends of the rotor core. In the example shown, two ferrite magnetic places are disposed in planes substantially parallel to each other on opposite sides of the axial center of the rotor. Axially extending soft iron pole pieces are disposed adjacent the inner and outer sides of the magnets for multiplying the magnetic flux by returning the magnetic flux from the axial extensions of the magnets to the center core. The soft iron pole pieces and the rotor core are further gapped or slotted along the direct and quadrature axes to avoid shorting the magnetic flux generated by the ferrite slabs to maintain reluctance torque.

Figure 1:
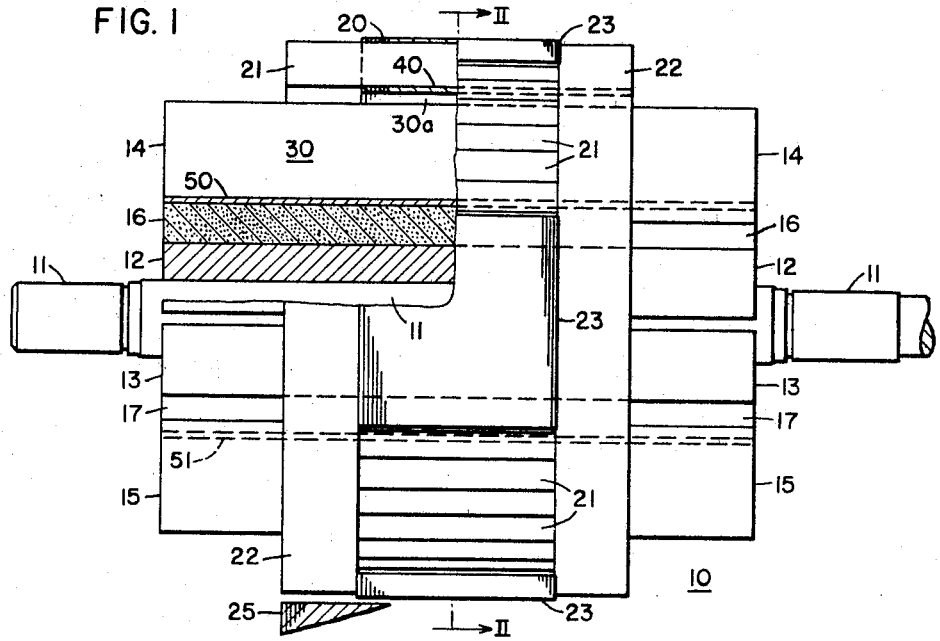

The present invention relates generally to permanent magnet rotors for rotating machines, and particularly to a rotor employing ferrite permanent magnets as the flux producing means.

Generators and synchronous motors often use permanent magnets to provide field excitation. Permanent magnets provide a more efficient operation since field windings for conducting exciting current are not required. One type of rotor structure commonly employed includes a hollow steel body or core supporting squirrel cage windings or damper bars on the outside thereof, and permanent magnets disposed in the hollow portion thereof. Because of the limited area available within the hollow portion for the magnets, high flux magnetic materials having a low coercive force, such as Alnico alloy, are usually employed in order to obtain appreciable useful flux from the magnets. The high flux magnets have, however, two important disadvantages, namely, high cost and low resistance to demagnetizing forces encountered in the machine.

The demagnetizing forces are many and varied; for example, at the asynchronous start of a synchronous motor, the permanent magnet is subjected to strong demagnetization from the main field of the stator. In generators with conventional permanent magnet poles, a short circuit or similar fault can cause high demagnetizing current in the stator with the resultant partial loss of magnetism and voltage. Also demagnetization may be a problem when the rotor is removed from the stator. In any case, the machine is out of service until the poles can be remagnetized.

In accordance with the broad principles of the present invention, the high cost and demagnetization problems associated with Alnico magnetic materials are avoided by using slabs or bars of ferrite permanent magnetic material, for example, strontium ferrite ($SrFe_{12}O_{19}$), lead ferrite ($PbFe_{12}O_{19}$), or barium ferrite ($BaFe_{12}O_{19}$), instead of the Alnico magnets. Ferrite magnet slabs are low in cost, have high coercive force, and have a magnetization characteristic that is highly resistant to the demagnetizing forces encountered in rotating machines.

The ferrite slabs are disposed in a hollow steel core or laminated stack and extend beyond the axial extremities of the stack. The ferrite slabs are further symmetrically disposed, one slab for every two machine poles, around the center axis of the rotor with soft iron pole pieces disposed adjacent the inner and outer faces or sides of the slabs in a pole fllux directing manner. Quadrature and direct axis gaps are provided in the pole pieces, and the rotor steel is slotted adjacent the gaps to prevent shorting the magnetic flux and to maintain reluctance torque.

Accordingly, the primary object of the invention is to provide an economical and magnetically stable permanent magnet rotor for dynamoelectric machines.

Another object of the invention is to provide a demagnetization resistant permanent magnet rotor for rotating machines in which ferrite permanent magnet slabs are disposed near the radial center of a rotor core or stack with axial portions extending beyond the length of the rotor stack.

A further object of the invention is to provide a permanent magnet rotor in which the magnetic flux produced by the axial extensions of permanent magnets supported within a center core or stack is effectively directed to and utilized therein.

Yet another object of the invention is to provide a permanent magnet rotor in which a permanent magnet slab is used to supply two poles and their associated air gaps with magnetic flux.

Another object of the invention is to provide a more efficient dynamoelectric machine having a permanent magnet rotor provided with axially extending permanent magnets which utilize end space within the stator of the machine that is ordinarily wasted.

A further object of the invention is to provide a permanent magnet rotor with a large intermal cavity providing ample area for accommodating permanent magnets while simultaneously providing ample rotor steel thickness so that excessive magnetic saturation of the rotor steel is avoided during operation.

Figure 2:
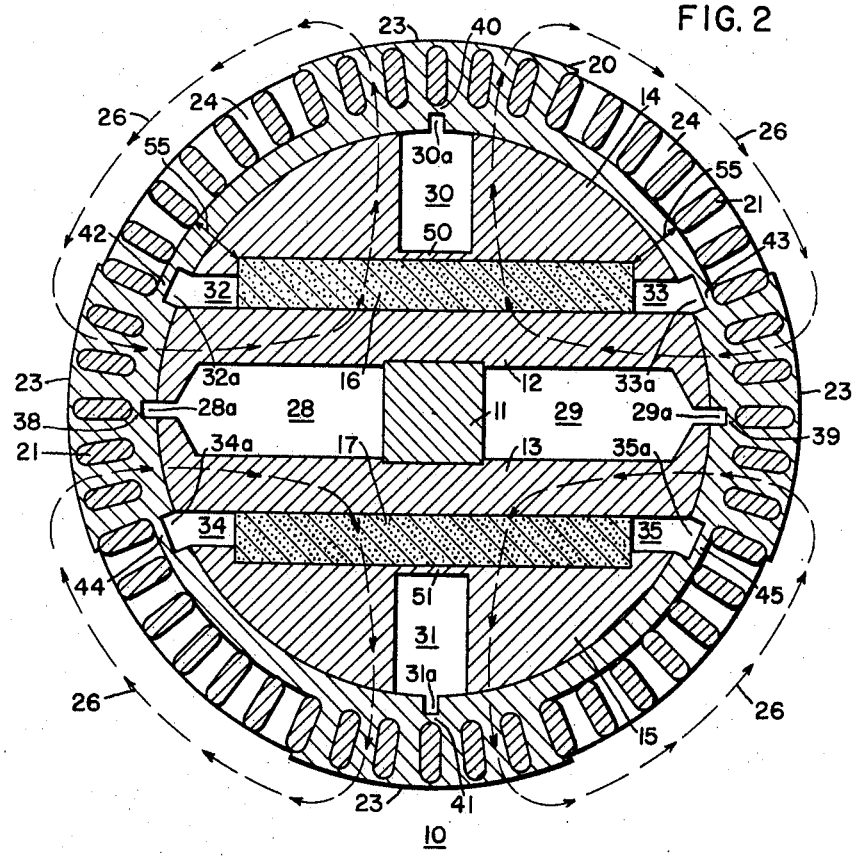

These and other objects and advantages of the invention will become more apparent from the following detailed description taken in connection with the accompanying drawing, in which:

FIGURE 1 is a side elevation view, with a portion thereof in section, of a four pole permanent magnet rotor constructed in accordance with the principles of the invention; and FIG. 2 is a cross-sectional view of the rotor taken along line II—II in FIG. 1.

Specifically, there is shown in FIG. 1, a permanent magnet rotor 10 comprising a centrally disposed, non-magnetic shaft 11 supporting inner soft iron pole pieces 12 and 13, outer soft iron pole pieces 14 and 15 and two slabs of ferrite permanent magnets 16 and 17 disposed respectively between the inner and outer pole pieces. The pole pieces and permanent magnets are disposed in a balanced manner within a steel core or laminated steel stack 20 adapted to support a plurality of axially extending conductor bars 21, shown in cross-section in FIG. 2. The conductor bars 21 may form a squirrel cage on the rotor 10, or the conductors 21 may serve as damper bars for generator operation. If a commutator is supplied, the rotor may be employed as the rotating field of a direct current motor with a stationary armature. In FIG. 1, a stator 25 of standard construction, only partially shown and having end turns (not shown), is disposed around the rotor 10 in a conventional manner. The conductor bars 21 are further secured in the stack 20 by end rings 22.

In FIG. 2, the rotor core 20 is shown divided into four salient poles 23 by the absence of rotor steel in interpolar spaces 24. This serves to increase the effective use of the magnetic flux, since a higher fundamental component is obtained by concentrating the flux into the salient poles. The use of salient poles, however, is not a necessary feature of the invention, and the four salient poles 23 depicted in FIG. 2 are shown only for the purpose of illustration.

As clearly shown in FIG. 2, the ferrite permanent magnet slabs 16 and 17 are disposed near the center of the cavity or hollow portion provided in the rotor steel so that they may have a maximum width dimension therein. A large percentage of the maximum available area within the cavity of the rotor is thus effectively utilized by the magnets. This is illustrated by the flux path lines (dashed arrows) 26 which show the two magnets 16 and 17 providing magnetic flux for the four poles 23. It should be noted further that the ferrite permanent magnets are employed herein in their most economical form, namely, a slab or plate configuration having generally a uniform and relatively small thickness dimension.

The configuration and location of the ferrite magnets 16 and 17 provide further for a more effective utilization of their flux producing areas. The small thickness dimension of the magnets allows for the disposition of the axially extending pole pieces 12 through 15 of adequate size and shape to direct the flux generated in the axial extensions of the ferrite magnets to the centrally disposed rotor stack 20. This effectively multiplies the area of the ferrite magnets and makes possible the utilization of space under the end extensions of the stator winding (not shown) which is ordinarily wasted space. The ends of the axial extensions of the outer pole pieces 14 and 15 may be rounded off so that their rectangular configuration, as shown in FIG. 1, would be somewhat modified in an ovoid manner.

The pole pieces 12 through 15 serve further to fill the space within the cavity of the rotor stack 20 (with the exception of reluctance gaps) so that the magnets 16 and 17 are secured therein in a rugged, compact manner.

In order not to lose the reluctance torque obtained from the use of salient poles 23, the inner pole pieces 12 and 13 are separated to form quadrature axis gaps or slots 28 and 29, and the outer pole pieces 14 and 15 are provided with quadrature axis gaps 30 and 31, respectively. The gaps 30 and 31 form narrow bridges of iron 50 and 51, respectively. The quadrature axis gaps compensate for the decrease in direct axis reactance due to the inclusion of direct axis gaps 32 through 35 provided between the inner and outer pole pieces at the lateral edges of the ferrite magnets 16 and 17. The rotor steel 20, adjacent each of the quadrature and direct axis gaps in the pole pieces, is partially removed or cut away to form slots 28a through 35a in the steel. The slots in the steel thus extend the area of the slots provided in the pole pieces as best seen in FIG. 2.

The slots 28a through 35a form narrow bridges of steel 38 through 45, respectively. The direct axis gaps and the narrow bridges provide high reluctance to the major portion of the magnetic flux generated by the ferrite slabs 16 and 17 thereby assuring that the major portion of the flux passes through the salient poles 23 and into the stator as useful flux.

The center shaft 11 is made of a non-magnetic material so that the shaft will not short the quadrature axis slots 28 and 29.

The bridges 38 through 45 and 50 and 51, though narrow, do have thickness dimensions which obtain some mechanical strength. Additional strength is obtained from the rugged squirrel cage formed by bars 21. It should be further noted that direct axis gaps are ordinarily provided at the center of the interpolar space; however, since the flow of interpolar flux is almost negligible, the symmetry of the rotor structure 10 is not substantially disturbed by locating the direct axis slots 32 through 35 as shown, which location is more convenient from a manufacturing standpoint.

Another advantage of the invention is the larger internal rotor diameter allowable with the rotor 10. Immediately before pull-in, in synchronous motor operation, the magnetomotive force (MMF) from the stator winding (not shown) and the MMF from the ferrite magnets will be exactly opposed. The alternating current flux and the magnet flux will then go through the direct axis gaps 32 through 35 and a portion of the rotor steel and outer pole pieces designated by the arrowed line 55. The thickness dimension of the portion 55 must be properly dimensioned, for this operating condition, to avoid excessive magnetic saturation. Similarly, all the steel below the conductor bars 21 must be dimensioned for this reason when excitation is developed from permanent magnets located in the rotor cavity. Since the physical area of the portion 55 is multiplied by the axial extensions of the soft iron pole pieces 12 through 15, the effective magnetic internal diameter of the rotor 10 can be increased by decreasing the amount of steel and iron, thereby allowing more area for larger size magnets 16 and 17.

Design of the rotor 10 involves optimizing the width of the direct-axis slots 32 through 35 and the corresponding height and width of the ferrite magnets 16 and 17, while holding the thickness dimension of the portion 55 and the shaft size to reasonable value. The entrance or face area of the soft-iron pole pieces adjacent the rotor core 20 determines the maximum axial extension of the magnets. However, this may be determined by other factors such as the maximum length of the overall machine.

Calculations on a 0.75 H.P., 4-pole, 60-cycle motor indicate that a motor using the invention will give superior performance and more output than its parent 3-phase induction motor without increasing motor length.

It should now be apparent from the foregoing description that a novel, economical and magnetically stable permanent magnet rotor has been disclosed. This is accomplished by the use of low cost, high coercive force ferrite permanent magnet slabs that are disposed within a hollow rotor core or stack and extend beyond the axial dimension of the stack. The axial extensions are then utilized to provide magnetic flux for the stack. This is accomplished by a plurality of axially extending, flux directing pole pieces disposed coextensively with the ferrite slabs. The result is the utilization of the flux potential of the ferrite magnets to their fullest extent. By so doing, the internal diameter of the rotor core can be maximized without causing substantial saturation of the core steel during operation of the machine.

While the invention has been described in connection with a preferred embodiment, it will be understood that it is not intended to be limited to the particular embodiment illustrated but is intended to cover all alternative and equivalent constructions falling within the spirit and scope of the appended claims. For example, the embodiment shown in the figures and described in detail is a four pole machine. The invention, however, is not so limited. Any number of poles may be derived from the inventive principles involved. For example, one ferrite magnet would provide a two-pole machine, three such magnets would provide a six-pole machine, and so on.

What is claimed is:
1. A rotor for a dynamoelectric machine comprising:
a hollow rotor core,
a shaft disposed in the radial center of said core and extending axially thereof,
at least one ferrite permanent magnet slab disposed within the hollow core and having a width dimension extending in a plane substantially parallel to the axis of the core and shaft, a length dimension extending axially of the core and shaft and beyond the ends of the core, and a thickness dimension,
flux directing pieces supported between the shaft and rotor core, and in a substantially coextensive manner with the ferrite slab for directing the flux produced by said ferrite slab into said rotor core, the flux directing pieces having direct axis gaps along edges of the ferrite slab in the thickness dimension.

2. The rotor recited in claim 1 in which the ferrite slab and pole pieces are so arranged that the one slab provides magnetic flux for at least two poles.

3. The rotor recited in claim 1 in which said rotor core has a plurality of poles and the ferrite slab and flux directing pieces are so arranged that the one slab provides magnetic flux for at least two of said poles.

4. The rotor recited in claim 1 including a second ferrite permanent magnet slab disposed in a coextensive manner with the first ferrite slab, the two ferrite slabs being positioned with said shaft therebetween, and
the two ferrite slabs providing magnetic flux for at least four of said poles.

5. The motor recited in claim 1 in which the rotor core is partially cut away to form salient poles.

References Cited

UNITED STATES PATENTS

| | | | |
|---|---|---|---|
| 2,735,952 | 2/1956 | Merrill | 310—261 |
| 2,913,607 | 11/1959 | Douglas | 310—261 |
| 2,939,025 | 5/1960 | Williford | 310—261 |
| 2,975,310 | 3/1961 | Armstrong | 310—261 |
| 3,012,161 | 12/1961 | Puder | 310—261 |
| 3,016,482 | 1/1962 | Andersen | 310—261 |
| 3,126,493 | 3/1964 | Honsinger | 310—156 |
| 3,210,584 | 10/1965 | Jorgensen | 310—261 |
| 2,303,893 | 12/1942 | Mullner | 310—156 |
| 2,418,980 | 4/1947 | Morrill | 310—156 |
| 2,927,229 | 3/1960 | Merrill | 310—162 |
| 2,133,082 | 10/1938 | Cox | 310—156 |
| 2,637,825 | 5/1953 | Moore | 310—156 |

FOREIGN PATENTS 545,890   9/1957   Canada.

MILTON O. HIRSHFIELD, Primary Examiner

A. G. COLLINS, Assistant Examiner

U.S. Cl. X.R.

310—156, 162